Feb. 7, 1950
S. A. BARRETT
2,496,372
TWO-WAY POLAR TELEGRAPH SYSTEM
Filed June 3, 1944
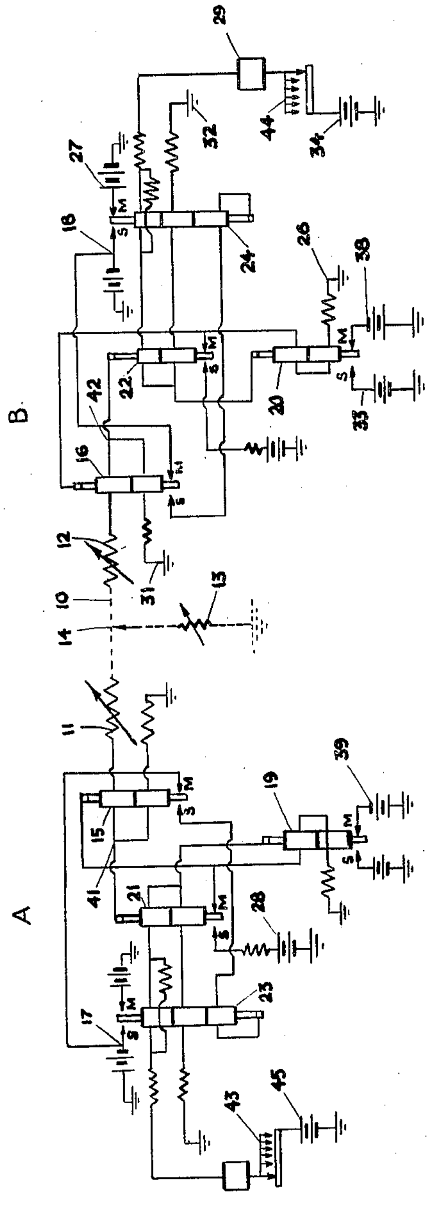
INVENTOR
Sidney Alfred Barrett
BY
Edward N. Fetherstonhaugh
ATTORNEYS Patented Feb. 7, 1950 2,496,372

UNITED STATES PATENT OFFICE 2,496,372

TWO-WAY POLAR TELEGRAPH SYSTEM

Sidney Alfred Barrett, Montreal, Quebec, Canada

Application June 3, 1944, Serial No. 538,572
In Canada June 12, 1943

5 Claims. (Cl. 178—58)

The invention relates to improvements in a self-compensating telegraph system for transmitting signalling impulses over communication lines, and more particularly, for transmitting these impulses over long open-wire lines subjected to varying weather and leakage resistance conditions and also to extreme changes in series line resistance, such as that occasioned by changing from lines of widely different values of series resistance.

The invention consists essentially of the novel features of a telegraph system as pointed out in the claims for novelty following a description containing an explanation in detail of acceptable forms of the invention.

In previous systems varying leakage resistance of the line, and relatively large changes in the series resistance of the line, made it necessary to adjust the receiving equipment connected to the line at rather frequent intervals to compensate for these changes in the resistance characteristics of the line, so that the received signals would be received without bias.

These adjustments are very undesirable, and add to the cost of the equipment, especially so at a telegraph subscriber's station remotely removed from the central telegraph station or repeater point.

It is an object of this invention to arrange an impulse transmitting system in which no variable apparatus is required in the transmitting or receiving equipment, this equipment being arranged in such a manner that automatic compensation takes place during varying weather conditions and/or large changes in series resistance of the line.

It is a further object of this invention to provide a telegraph system in which the apparatus at each end of the line applies similar signalling conditions to the line to transmit similar conditions or impulses.

Still another object of this invention is to provide telegraph line circuit between two telegraph stations either or both of which may be a central station or an outlying station, the operation of which is automatically self-compensating for changes in the insulation resistance of the line and/or changes in the series of the line.

In accordance with a specific embodiment of this invention two telegraph stations are connected together by a telegraph line or channel, a portion of which includes open wire line subjected to varying weather conditions and thus to varying leakage resistance, and also to changes in series resistance due to any changes caused by changing the line from wires of one gauge to that of another gauge. Similar line and receiving relays are connected to this line at each of the stations for responding to the signalling conditions transmitted from the opposite end of the line.

Means are provided at each station whereby the line relays reverse the polarity applied at the receiving end of the line in response to reversals of polarities applied to the sending end of the line. Thus the receiving relays respond to the signal conditions transmitted to them by the line relay without bias due to variations in the leakage resistance of the line, and/or changes in the series resistance of the line, these changes being automatically compensated for during the transmission of the signalling impulses.

The term "bias" as used in this specification and applied to signal impulses, indicates a lengthening or shortening of the signal conditions or impulses. Marking bias, for example, means that the marking impulses are lengthened while the spacing impulses are shortened, whereas spacing bias means that the spacing impulses are lengthened while the marking impulses are shortened. Signal impulses containing bias are much less satisfactory for operating telegraph apparatus than those in which no bias exists, while signals having no bias are much more satisfactory for operating telegraph apparatus.

A common cause of this lengthening and shortening of the various signalling conditions or impulses is the marking current being greater than the spacing current, thus causing marking bias, and conversely, if the spacing current is greater than the marking current, spacing bias will exist. In other words, the marking and spacing currents are of unequal value. The unequal currents cause the receiving device to respond differently to the two signalling conditions, thus adding a bias to the received signals.

However, in accordance with this invention the two signalling conditions always differ the same amount since the changing line conditions are compensated for automatically from an established flux condition of the line relays, these unbiased signals being repeated into the windings of the receiving relays. The term "marking" is used to designate the line or signalling condition during the time when no impulses are being transmitted but the system is energized and ready to transmit signalling impulses. The term spacing designates the other signal or line condition. The invention will be described in connection with the accompanying drawing in which Figure 1 shows a preferred arrangement of the invention as embodied at two central office telegraph stations, A and B.

These stations are connected together by line 10 which is composed of resistance 11 and resistance 12. Line 10 is also subject to a leakage resistance which is represented by a concentrated resistance 13 which is shown connected to line 10 at point 14. Point 14 need not be the electrical centre of the line but in order to simplify the explanation it will be assumed that this point is at the centre of the line.

At stations A and B line 10 connects to the upper winding of line relays 15 and 16. The lower winding of these two relays are provided with a fixed amount of marking current from negative potentials 17 and 18. Thus line relays 15 and 16 are held to their marking contacts. Receiving relays 19 and 20 are held to markings by negative polarities connected to the marking contacts of send relays 21 and 22 respectively. Send relays 21 and 22 are held to their marking contacts by marking current in their upper or operating windings which is approximately twice the value of their lower or bias windings. Control relays 23 and 24 are held to their marking contacts by marking current in their upper or operating windings, which is approximately one third greater than the spacing current in their lower or bias windings. When the system is in the marking or non-signalling condition, no current flows in the lower or locking windings of the control relays 23 and 24.

Assume first that station A is transmitting signal impulses to station B. Sending relay 21 and control relay 23 will be moved to their spacing contact in response to signals originating in the sending contacts 43. Marking current will flow in the line windings of line relay 15 and spacing current will flow in the line winding of line relay 16 at B. If the line current in the line winding of line relay 16 at B is slightly greater than the marking current in its lower winding the armature of this relay will move from its marking contact. Spacing current flowing over the line 10 will flow through both windings of relay 16 to ground 31 and its armature will move to its spacing contact. Simultaneously a portion of the current flowing over line 10 will flow through the windings of receiving relay 20 to ground 26 to move its armature to its spacing contact.

When the line relay 16 at B reaches its spacing contact its armature will be connected to positive potential 27 via the armature and marking contact of control relay 24. Like potentials will now be connected to each end of the line and if there is no leakage on line 10, no current will flow in the upper or line windings of line relay 15 at A and 16 at B.

Since line relay 16 at B is now connected to positive potential 27, the current in its lower winding will have a spacing effect upon its armature, and since positive potential 27 is of the same value as negative potential 18 at B the same amount of current will flow in its lower windings, and since positive potential 28 at A is of the same value as positive potential 27 at B there will be no current flowing in line 10 unless there is leakage on the line.

From this it can be seen that provided there is sufficient current flowing in the line when send relay 21 is on spacing to move line relay 16 armature away from its marking contact, the series resistance of the line is of secondary importance, since with either minimum or maximum line resistance, relay 16 at station B will have its armature moved with the same force to space as to mark.

It will be noted here that when receiving relay 20 at station B is moved to its spacing contact positive potential 33 will oppose positive potential 34 and no current will flow in the upper windings of send relay 22 and control relay 24. Likewise, no current will flow in printer magnet 29 and the receiving device or printer magnet will register a spacing signal. Due to the duplex bridge arrangement however, marking current will flow in the lower or bias winding of send relay 22 and the middle or bias winding of control relay 24 to ground 32. Consequently these two relays will have their armatures held on their marking contacts when a spacing signal is received by receiving relay 20.

Control relays 23 and 24 at station A and B respectively, are provided to maintain a negative or marking potential on the marking contact of the send relay during transmission. For example, when a spacing impulse is transmitted from station A to station B, control relay 23 moves to its spacing position and connects negative or marking polarity 17 to the windings of receiving relay 19 via the spacing contact of line relay 15, thus holding receiving relay 19 on its marking contact, while at the same time retaining a marking or negative potential on the marking contact of send relay 21 while its armature is resting on its spacing contact. It is obvious from this, that when send relay 21 is restored to its marking position, negative or marking polarity 17 will be connected to the line at station A in opposition to positive or spacing potential 27 at station B. It will be noted here that during the time send relay 21 at station A is moving from its spacing to its marking contact, spacing current is flowing from positive potential 27 at B, through both upper and lower windings of line relay 15 at station A in a direction effective to hold its armature on its spacing contact, thereby retaining marking potential 17 on the marking contact of send relay 21 and a marking current in windings of receiving relay 19.

When send relay 21 at station A reaches its marking contact, current flows over line 10 from positive potential 27 at station B to negative potential 17. The current in the line winding of line relay 16 at station B is marking, while the line current in the line winding of line relay 15 at station A is spacing. This condition will prevail until line relay 16 at station B has its armature moved away from its spacing contact by the marking current flowing in its upper or line winding. After line relay at station B has its armature moved away from its spacing contact, current will flow over line 10 from negative potential 17 at station A through both windings of line relay 16 to ground 31, this current being in a direction to move its armature to its marking contact. Simultaneously, marking current will flow through the windings of receiving relay 20 at station B, and its armature will be moved to marking.

It should be noted here that during the time send relay at station A is moved from space to mark, that control relay 23 is locked to spacing by spacing current in its lower or locking winding via the spacing contact of line relay 15 adding to the spacing current in its middle or bias winding. The combined effects of these two spacing currents is sufficient, due to the shunt around its upper or operating winding, to overcome the effect of the marking current in its upper winding, until line relay 15 leaves its spacing contact and releases the spacing current in the lower winding of control relay 23, hence line relay 15 now unlocks relay 23. In other words, control relay remains locked to spacing until the line relay 16 at station B has responded to the marking pulse. That is to say that during transmission the line relay at the transmitting station remains on spacing during a space to mark transition of the send relay, thereby locking the control relay to spacing as described, until the line relay at the receiving end has responded to the marking pulse being transmitted. By this means, the receiving relay 19 at station A, or receiving relay 20 at station B, is held to marking during transmission from station A or B respectively.

It is apparent from the above that line relay 16 at station B is made to respond to marking and spacing impulses transmitted from station A by send relay 21 in such a manner that the potentials connected to the line at station B are made to reverse, that is to say, a positive polarity for a space pulse, and a negative polarity for a mark pulse. These reversals of polarity opposing those connected at the sending end of the line, simultaneously reversing the current in the lower windings of either line relay 15 at station A or line relay 16 at station B, depending upon the direction of transmission. It is to be understood that the operation and function of the line, receive, control and send relays at station B function in the manner described for transmission from station A in a like manner.

It should be further apparent that since the marking and spacing currents in the windings of line relay 16 and receiving relay 20 at station B are of the same value and their algebraic sum equal to zero, there will be no bias due to changes in the series resistance of the line.

It can be further shown that the above is true for lines having leakage from the following:

Assume, for example, that line 10 is subject to leakage as shown by resistance 13. When the system is in the marking or non-signalling condition current will flow over line 10 comprising resistances 11 and 12. This current will have a spacing effect upon the armatures of line relays 15 and 16 at station A and B respectively. Providing it is not sufficient to overcome the marking current in the lower windings of these relays, their armatures will remain on marking. If now, for example, a spacing impulse is transmitted from station A to B, as described above, positive potential 28 and positive potential 27 at station A and B respectively, will be connected to the line. Current from positive potential 27 will flow through the line windings of relay 16 at station B over some portion of the line to ground through the leakage path. This current will have a marking effect upon the armature of relay 16. The only effect of this current will be to reduce the effective spacing current in its lower winding and, since the applied voltage at points 41 and 42 are at the same potential for both conditions of signalling, the marking current in the line winding of line relay 16 will be of the same value as the space current due to leakage when the system is in the marking condition. In other words, the algebraic sum of these two leakage currents is equal to zero, and the signal transmitted by send relay 21 will be received by line relay 16 at station B without bias. Likewise, the resultant magnetic effects of the marking and spacing currents in the lower windings of line relay 16 will have their algebraic sum equal to zero. Therefore, there can be no bias in the received signal due to a leakage.

It will be noted however, that during periods of low insulation the amount of marking and spacing current during the travel-time of the armature of relay 16 will be reduced, as compared to the no-leakage condition. However, since these two currents are equally attenuated, there will be no bias on line relay 16 from this source. It will be further noted that the marking and spacing currents in the windings of receiving relay 20 will also be attenuated equally during this period, hence no bias distortion will appear in the windings of this relay in the signals transmitted from sending relay 21 at station A.

It is apparent from the above description, that the impedance of the line is the same for both conditions of signalling, that is to say, the same amount of current will flow over the line for a marking impulse as for a spacing impulse from either send relay 21 or 22. It follows therefore, that the armatures of line relays 15 and 16, depending upon the direction of transmission, will have their armatures moved from either their marking or spacing contacts by the same amount of current, irrespective of the value of the series resistance of the line, providing this resistance does not exceed the maximum value. In other words, the algebraic sum of these two currents will be zero regardless of line resistance. Therefore there will be no bias in the signals received from either station A or station B from this source.

It follows from the above, that under all conditions of signalling, no bias can be introduced into the received signals, either from large changes in the series resistance of the line itself, or from large changes in the leakage resistance of the line. Consequently, it is not necessary to provide adjustable biasing means in either the sending or receiving apparatus at either end of the line to compensate for the above changes in the characteristics of the line.

Positive potentials 45 and 34 are of like value but of opposite polarity to those connected to potentials 39 and 38 which are connected to the marking contacts of receiving relays 19 and 20 respectively, consequently providing approximately twice the amount of marking current in the upper winding than of spacing current in the lower windings of send relays 21 and 22 at station A and B respectively. Due to the shunt around the upper windings of control relays 23 and 24 however, the marking current in the upper windings of these relays effectively reduced to approximately only one third greater than the spacing current in their middle or bias windings. The purpose of the lower or locking windings of control relays 23 and 24 is as previously described, to hold its armature to spacing thus holding the receiving relays 19 and 20 on their marking contacts during the transmission from either station A or B respectively.

When either receiving relays 19 and 20 at stations A or B respectively are on their spacing contacts, there will be no current in the upper windings of control and send relays 23, 24, 21 and 22 at stations A or B respectively, since the positive potential on the spacing contacts of receiving relays 19 or 20 opposes the positive potentials 45 and 34 depending upon the direction of transmission. However, when either receiving relay 19 or 20 are on their spacing contacts, marking current will flow in the lower windings of send relays 21 and 22 respectively and through the middle windings of control relays 23 and 24 respectively. Both of these relays therefore will be held to their marking contacts when either receiving relay 19 or 20 are on their respective spacing contacts, depending upon the direction of transmission. It is to be understood that the windings of relays 21 and 23, and 22 and 24, have their windings connected differentially. In other words, relays 21 and 23 and 22 and 24 respond only to signals originating in sending contacts 43 and 44 respectively.

The invention is not to be construed as limited to the specific form that has been disclosed herein for illustration, but its scope is defined in the claims.

What I claim is:

1. A telegraph communication system comprising a line, first and second stations connected to each end of said line, sending contacts located in each of said stations, polarized relays at each end of the line for transmitting two different signalling impulses, polarized relays provided for repeating the signalling impulses to a local circuit located in each of said stations, polarized relays at each end of the line arranged in cooperation with certain other of the aforementioned polarized relays in such a manner that two different signalling impulses will have an equal and opposite effect regardless of the series resistance of the line and/or the insulation resistance of the line, these impulses being repeated into certain of said polarized relays which form a part of the local circuits, and polarized control relays located in each of said stations whereby the last mentioned polarized relays are held to their closed or marking positions during the time that signalling impulses are being transmitted into the line through polarized relays of said local circuits operated through said sending contacts.

2. A telegraph communication system comprising a line, first and second stations connected to each end of said line, sending contacts located in each of said stations, polarized sending relays at each end of the line for transmitting two different signalling impulses, polarized receiving relays for repeating the signalling impulses to a local circuit located in each of said stations, polarized line relays at each end of the line arranged as a part of the polarized receiving relays in such a manner that two different signalling impulses will have an equal and opposite effect regardless of the series resistance of the line and/or the insulation resistance of the line, these impulses being repeated into said polarized receiving relays, and polarized control relays located in each of said stations whereby said polarized receiving relays are held to their closed or marking positions during the time that signalling impulses are being transmitted into the line by the said polarized sending relays of the local circuits operated from said sending contacts.

3. A telegraph communication system comprising a line, a first and second station connected to each end of said line, a polarized line relay at each end of the line in said stations, each of said stations consisting of a circuit forming sending and receiving means, sending contacts located in each of the sending means of said stations, polarized sending relays in the sending means of each station and controlled by said sending contacts transmitting impulses of positive and negative polarity such impulses operating the line relay at the receiving end of the line in such a manner that the reversal of polarity received by the line relay at the receiving station being transmitted back over the line towards the station transmitting the impulses in such a manner that the operation of the line relay at the receiving end of the line is affected in the same manner for both of the signalling impulses received, regardless of the changes in the series resistance of the line and/or the insulation resistance of the line, therefore the algebraic sum of the two signalling impulses is equal to zero for the above mentioned condition.

4. A telegraph communication system comprising a line, a first and second station connected to each end of said line, each of said stations consisting of a circuit forming a sending and receiving means, a polarized line relay at each end of the line in said stations, sending contacts located in each of the sending means of said stations, polarized sending relays controlled by said sending contacts transmitting impulses of positive and negative polarity, said impulses operating a line relay at the receiving end of the line in such a manner that the reversals of polarity received by the line relay at the receiving station being transmitted back over the line towards the transmitting station in such a manner that the operation of the line relay at the receiving end of the line is affected in the same manner for both of the signalling impulses regardless of changes in the series resistance of the line and/or the insulation resistance of the line, therefore the algebraic sum of the two signalling impulses is equal to zero for the above mentioned line conditions.

5. In a telegraph communication system, a line, a polarized relay at each end of the line, means at each end of the line for transmitting two different signalling impulses and means at each end of the line for receiving two different signalling impulses with means provided for repeating these signalling impulses into a local circuit, the said polarized relay arranged as part of the receiving device in such a manner that two different signalling impulses will have an equal and opposite effect regardless of the series resistance of the line and/or the insulation resistance of the line and means at each end of the circuit whereby the receiving relay is held to its closed or marking contact during the time that signalling impulses are being transmitted into the line by the local circuit, means provided in the apparatus so that when either one of the two signalling impulses are transmitted to the line an equal and opposite polarity is applied at the receiving end of the line in such a manner that the bias current in the line and receiving relay will be reversed for each reversal of polarity applied by the transmitting relay at the sending end of the line, the reversal of polarity at the receiving end in response to reversal of polarity at the sending end is applied to the line at the receiving end by the marking and spacing contact of the line relay at the receiving end in such a manner that the marking and spacing signalling impulses as transmitted from the sending end of the line will have the same effect on the polarized relay connected in the line both for marking and a spacing impulse.

SIDNEY ALFRED BARRETT.

REFERENCES CITED

The following references are of record in the file of this patent:

UNITED STATES PATENTS

| Number | Name | Date |
|---|---|---|
| 2,131,870 | Cramer | Oct. 4, 1938 |
| 2,133,380 | Deardorff | Oct. 18, 1938 |
| 2,136,984 | Smith | Nov. 15, 1938 |
| 2,140,673 | Greene | Dec. 20, 1938 |
| 2,353,004 | Bascom | July 4, 1944 |